US005765660A

United States Patent [19]
Ambrosi

[11] Patent Number: 5,765,660
[45] Date of Patent: Jun. 16, 1998

[54] AUTOMATIC APPARATUS FOR RELEASING SAFETY BELTS OF MOTOR VEHICLES OR THE LIKE IN CASE OF EMERGENCY

[76] Inventor: Danti Ambrosi, Via Borghetto, 26 37058, Sanguinetto (Verona), Italy

[21] Appl. No.: 622,557

[22] Filed: Mar. 25, 1996

[30] Foreign Application Priority Data

Apr. 14, 1995 [IT] Italy ................ VR95 A 0038

[51] Int. Cl.$^6$ ................ B60R 22/32
[52] U.S. Cl. ................ 180/268; 280/801.1
[58] Field of Search ............ 280/801.1; 180/268, 180/271

[56] References Cited

U.S. PATENT DOCUMENTS

| 3,963,090 | 6/1976 | Hollins | 180/268 |
|---|---|---|---|
| 4,174,015 | 11/1979 | Farcinade | 180/268 |
| 4,189,022 | 2/1980 | Lazich et al. | 180/268 |
| 4,553,625 | 11/1985 | Tsuge et al. | 180/268 |
| 5,165,498 | 11/1992 | Garboli et al. | 280/801.1 |

FOREIGN PATENT DOCUMENTS

| 2463028 | 3/1981 | France | 180/268 |
|---|---|---|---|
| 2631594 | 11/1989 | France | 180/268 |
| 3602559 | 12/1986 | Germany | 180/268 |
| 63-13846 | 1/1988 | Japan | 180/268 |
| 63-247149 | 10/1988 | Japan | 180/268 |
| 5-139246 | 6/1993 | Japan | 180/268 |
| 609286 | 2/1979 | Switzerland | 180/268 |

*Primary Examiner*—Paul N. Dickson
*Attorney, Agent, or Firm*—Notaro & Michalos P.C.

[57] ABSTRACT

An apparatus for permitting an immediate release of safety belts of vehicles allows passengers to escape in case of emergency or in circumstances dangerous to the passengers. The apparatus has a series of sensors (3, 4, 5, 6, 7, 8) connected to a distributing station (9), an auxiliary battery (13), relays (10 and 14) and a microgearmotor (16) which can pull cables (17) that are connected to opening elements which permit the belt fasteners (2) to be disconnected. The microgearmotor (16) may be replaced by a microcompressor acting with a piston to provoke the traction of the cables (17). According to another possible variant the microcompressor acts directly on hydraulic or pneumatic ducts each of which operates a micropiston which is provided in the belt fastener (2).

8 Claims, 2 Drawing Sheets

AUTOMATIC APPARATUS FOR RELEASING SAFETY BELTS OF MOTOR VEHICLES OR THE LIKE IN CASE OF EMERGENCY

FIELD AND BACKGROUND OF THE INVENTION

The present invention refers to an apparatus for permitting an automatic release of safety belts of motor vehicles or the like in case a particular situation of emergency should occur.

As is known, at present safety belts are used in motor vehicles to keep the passengers firmly in their seats also in case of a frontal collision or other road accidents causing dangerous anomalous thrusts. Further it is known that in general the safety belt consists of a belt made of a particular cloth. Such a belt is fastened on the waist or trunk by means of a belt fastener. The belt is opened by pressing a suitable release button. However, the safety belt itself could be a danger for the passenger in case a particular situation of emergency should occur such as a fall or sinking of the vehicle in the water, fire within the vehicle or in the engine compartment, the presence of gas or carbon monoxide in the interior or engine compartment, overturning of the motor vehicle, collision or other similar critical events.

In such cases or in other similar particular circumstances of emergency, the safety belt binding the passenger fast to the seat should be released immediately otherwise the belt itself would prevent the passenger from going out quickly from the motor vehicle to save himself above all and to prevent the vehicle from provoking worse damage.

SUMMARY OF THE INVENTION

The present invention proposes to eliminate the inconvenience caused by the difficulties in releasing the safety belts in case of emergency, and more particularly the present invention proposes a device for releasing automatically the safety belts of the motor vehicles when there occur situations in which there is a danger to the passengers.

Further, the present invention proposes that such a device comprise a series of suitable sensors which are able to recognize specific situations of danger and intervene by releasing automatically the opening device of the safety belt.

All the above described specific aims and functions are reached according to the present invention through means for releasing automatically safety belts of motor vehicles or the like when a situation of emergency occurs, such means comprising a series of sensors for releasing the belt fastener, the release being accomplished through suitable electric, mechanic, pneumatic operating elements or the like, characterized by the fact that the releasing means may comprise a microgearmotor or the like which pulls cables directly to open the releasing elements of the belts, and that the microgearmotor is powered by at least an auxiliary emergency battery and acts through a relay or the like which is controlled by an electronic distributing station which is connected by the sensors; The auxiliary battery is kept in a condition of recharge by a distributing recharging station which is connected to the electric circuit of the motor vehicle in which the auxiliary battery is provided according to a possible variant the microgearmotor may be replaced by a microcompressor operating a piston for drawing the cables or the microgearmotor may be replaced by a microcompressor which is connected through suitable ducts with a series of pistons which are arranged in relation to locking and unlocking elements for locking and unlocking the belts.

FIELD AND BACKGROUND OF THE INVENTION

Other characteristics and details of the present invention will better result from the following description which describes a preferred type of embodiment as a not limiting example as well as from the accompanying drawing wherein.

DESCRIPTION OF THE PREFERRED EMBODIMENTS

Figure 1:
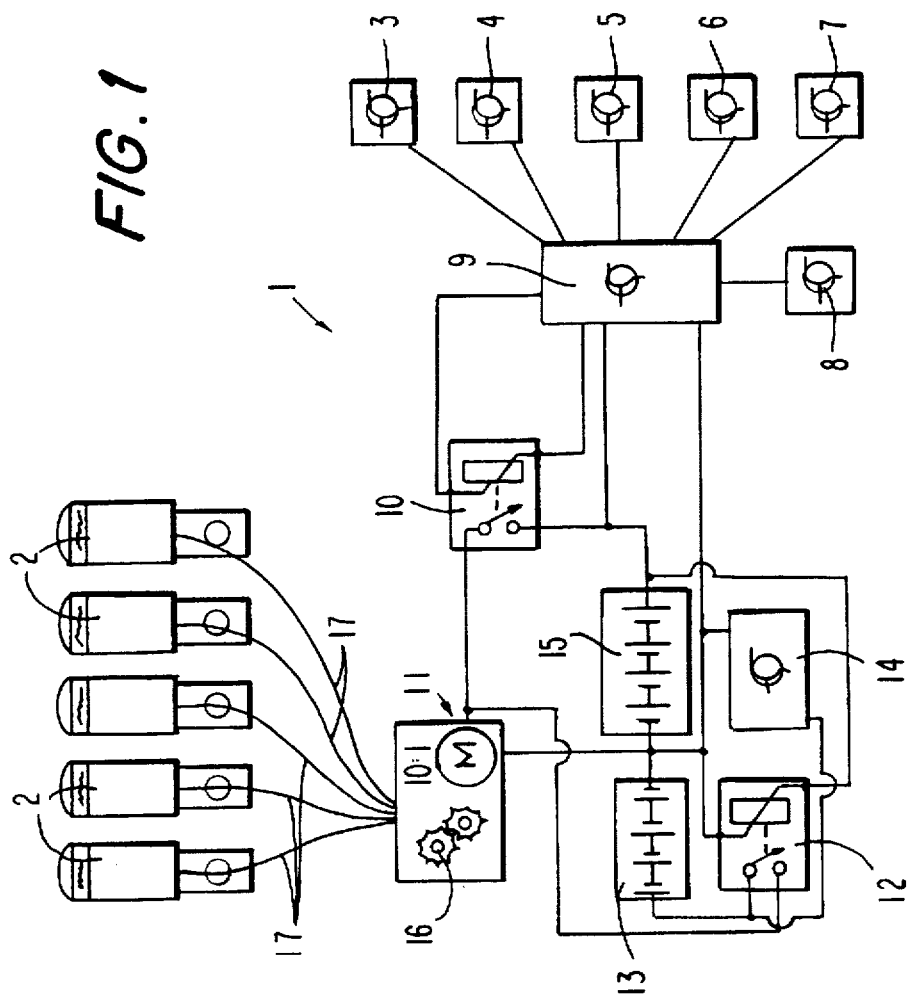
FIG. 1 is a diagram representing the means according to the present invention for automatically opening belts in case of emergency.

With reference to the accompanying drawing, number 1 denotes a device for automatically releasing safety belts of motor vehicles. Such a device is provided with some components which sense particular accidental events which might occur when driving the motor vehicle and other components which provoke an automatic release of the belts which are fixed in the conventional belt fasteners 2.

The components sensing the accidental events are for instance an electronic sensor 3 which senses the presence of water, an eletronic sensor 4 which senses the presence of fire, an electronic sensor 5 which senses the presence of methane gas or LPG, an electronic sensor 6 which senses a collision and an electronic sensor 7 which senses an overturning of the motor vehicle. It is also possible to fit out an auxiliary sensor 8 which senses any other anomaly which makes a release of the belts necessary.

Each of the above described sensors is placed in the corresponding sector of the vehicle where the anomaly the sensor is sensitive to might occur.

All the sensors are connected to an electronic distributing station 9. The distributing station 9 which receives sensor signals and can issue command signals in its turn is connected to a series of devices, i.e.: a relay 10 operating a fastener actuator in the form of a microgearmotor 11, a further relay 12 for a operating an emergency circuit, an emergency battery 13 and a distributing station 14 for recharging the battery which can be activated by control signals from station 9.

The above indicated elements are connected directly or indirectly with electric members of the vehicle they are fit out on. Moreover, such elements are connected to the main battery 15 of the motor vehicle.

The releasing elements for releasing the fasteners 2 of the safety belts comprise a microgearmotor 16, which is connected to a series of steel cables 17, which are inserted in corresponding flexible sheathes. The cables 17 intervene in the releasing means for releasing the safety belts.

When the microgearmotor 11 is activated, it provokes an immediate traction of the cables 17 which intervene in the releasing means in order to release the belt fasteners.

Figure 2:
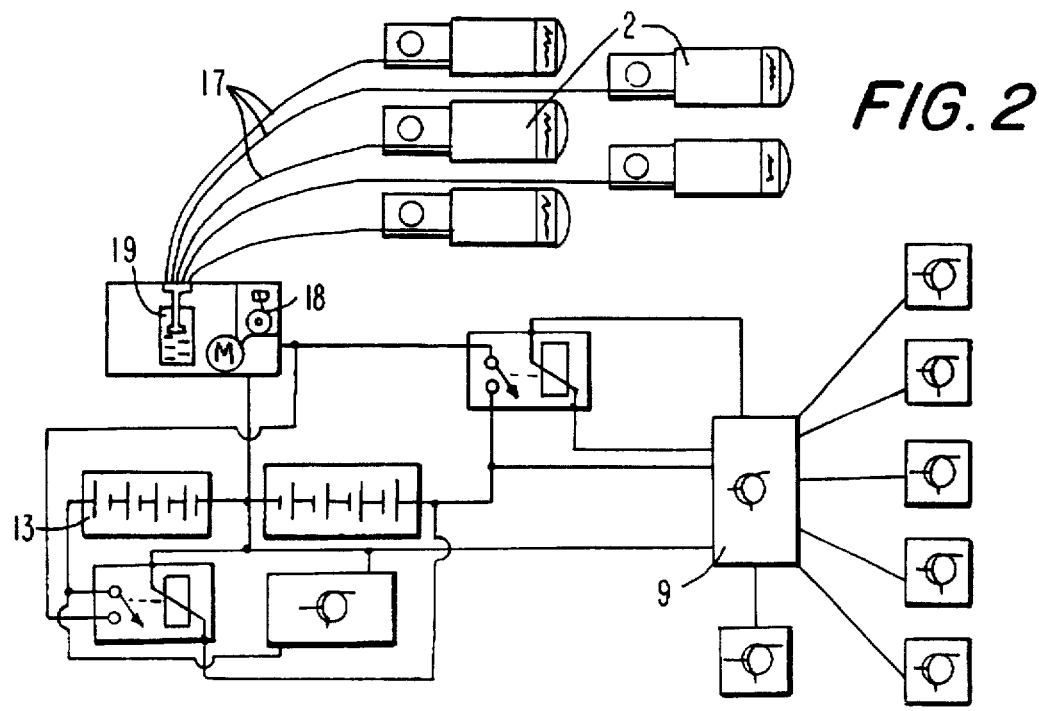
FIG. 2 is a diagram representing a possible variant of the means according to the present invention.

According to a possible variant as shown in FIG. 2, the microgearmotor may be replaced by a microcompressor 18 acting as the fastener actuator in combination with a piston 19. The piston 19 provokes the traction of the cables 17, as described before.

Finally, according to another possible variant, the above indicated microcompressor 18 acts directly on hydraulic or pneumatic ducts 20 each of which permits a micropiston 21 to be actuated, a micropiston 21 being arranged in every belt fastener 2. Cables 17 and ducts 20 are thus collectively referred to as lines for releasing the fasteners 2.

Now we shall describe briefly an example of working of a device according to the present invention.

When a motor vehicle provided with the present device is driven, it is possible to normally fasten the belts to the fasteners 2 according to the usual locking operations.

The microgearmotor 11 remains with its traction means completely shifted forward until an accidental event occurs so that no tension is practised on the cables 17. Therefore the cables 17 remain loose and it is possible to normally use the safety belts and the belt fasteners.

On the contrary, when one or more sensors 3-8 are excited by the specific accidental events to which the sensors are sensitive, for instance the presence of water, fire or gas in the vehicle, the overturning of the vehicle itself or a collision, a contact is automatically emitted for exciting the electric distributing station 9.

The distributing station 9 controls the closing of the relay 10 which provokes the actuation of the microgearmotor 11 through the automatic operation of the auxiliary battery 13.

The actuation of the nicrogearmotor 11 provokes then the traction of the cables 17 which in turn provoke the immediate opening of all the belt fasteners 2 so that the safety belts are released.

Figure 3:
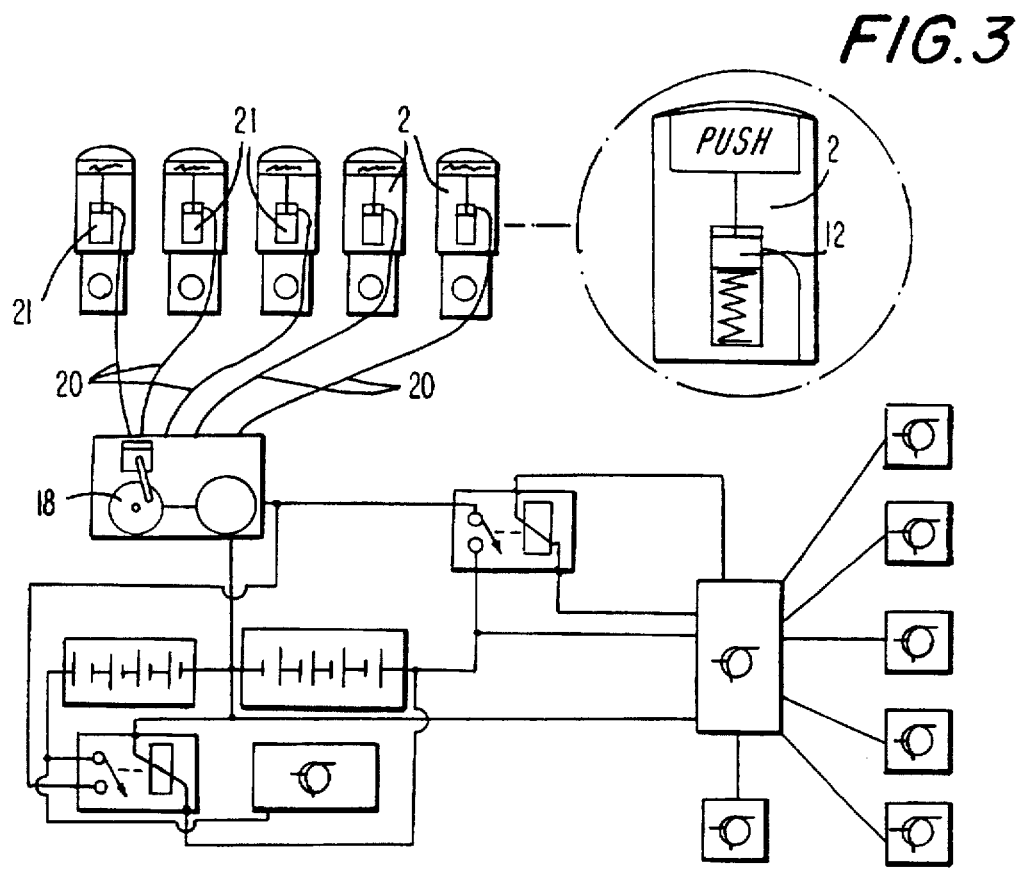
FIG. 3 shows a diagram representing another possible variant of the means according to the present invention.

It is to be noted that the operation of the auxiliary battery 13 permits the means in question to be actuated in whatever case in which the electric circuit is damaged owing to several reasons or the electric current has gone out from the main battery of the motor vehicle. The same way of operation, or a way of operation similar to the described one is also obtained by using the means according to the variants, as shown in FIGS. 2 and 3. In the first instance, a microcompressor 18 actuates a piston 19 for the traction of the cables 17.

In the second instance, a microcompressor 18 actuates directly the pistons 21 to open the belt fasteners.

As an advantage, all the components of the present device except the sensors are contained in a watertight box so that they are always protected from water infiltrations that would damage the operation, the sensors being placed in the relative control sectors.

Another advantage consists in the fact that the typical purpose of the safety belts is not annuled, i.e. the purpose of keeping the passengers well firm to the seats of the motor vehicles in case of collision or overturning. In fact, some sensors such as the sensors sensitive to the presence of water or fire may be calibrated so as to immediately release while other sensors such as the sensors sensitive to collisions, overturnings and presence of gas may be delayed electronically. In case of combined events, the collision and overturning sensors with delayed release may have the priority on the other sensors.

The present automatic means for releasing the safety belts have been described and represented according to preferred solutions. However, some variants may be provided which are technically equivalent to the mentioned mechanical parts and components and therefore such variants are to be considered within the range of protection of the present invention.

I claim:

1. An apparatus for automatically releasing a plurality of safety belts in a vehicle, each safety belt having a fastener (2) which is activatable for releasing a safety belt connected to the fastener, the vehicle having a main battery (15), the apparatus comprising:

an electronic distributing station (9) adapted to receive multiple sensor signals and to issue multiple command signals, said distributing station being connected to the main battery (15);

a plurality of emergency event sensors for generating sensor signals in response to a plurality of emergency events, each sensor being connected to said distributing station (9), said sensors including a water emersion sensor (3), a fire sensor (4) and a collision sensor (6);

a rechargeable emergency battery (13) which is in addition to the vehicle battery (15);

recharging means (12, 14) connected to said emergency battery and to said distributing station (9) for maintaining a charge on said emergency battery (13);

a relay (10) connected to said distributing station (9) for receiving a command control signal for activating said relay;

said distributing station containing signal means for delaying issuance of the control signal to said relay once a sensor signal has been received, in the event a signal sensor is received from said collision sensor (6) and for immediately issuing a control signal to activate said relay when a signal is received only from said emersion sensor (3) or from said fire sensor (4), the control signal being delayed for delaying activation of said relay when a signal is received both from said collision sensor (6) and from at least one of said emersion and fire sensors (3,4);

a fastener actuator (11, 18) connected to said relay (10) for producing mechanical work when the relay is actuated; and a plurality of lines (17,20) connected between said fastener actuator and each of said fasteners for transmitting the mechanical work to each of the fasteners to actuate each of the fasteners to release the belts.

2. An apparatus according to claim 1 wherein said sensors further include a gas sensor (5) for sensing a harmful gas in the vehicle and an overturn sensor (7) for sensing an overturning of the vehicle, said signal means in said distributing station delaying issuance of the control signal when a sensor signal is received from said overturn sensor, and said signal means in said distributing station immediately activating said relay when a sensor signal is received from said gas sensor unless at least one of said overturn and collision sensors have issued a sensor signal.

3. An apparatus according to claim 1 wherein said fastener actuator comprises a microgearmotor (11), said lines each comprising a cable (17) connected to one of said fasteners and connected to said microgearmotor for being pulled by said microgearmotor to actuate said fasteners.

4. An apparatus according to claim 2 wherein said fastener actuator comprises a microgearmotor (11), said lines each comprising a cable (17) connected to said fasteners and connected to said microgearmotor for being pulled by said microgearmotor to actuate said fasteners.

5. An apparatus according to claim 1 wherein said fastener actuator comprises a microcompressor (18), a piston (19) in said fastener actuator connected to said microcompressor for being moved by said microcompressor, said lines comprising cables (17) connected between said piston (19) and each of said fasteners for being pulled by said piston to actuate said fasteners.

6. An apparatus according to claim 2 wherein said fastener actuator comprises a microcompressor (18), a piston (19) in said fastener actuator connected to said microcompressor for being moved by said microcompressor, said lines comprising cables (17) connected between said piston (19) and each of said fasteners for being pulled by said piston to actuate said fasteners.

7. An apparatus according to claim 1 wherein said fastener actuator comprises a microcompressor (18), said lines comprising a plurality of ducts (20) connected between said microcompressor and said fasteners, and a piston (21) in each fastener for being actuated by fluid from said microcompressor supplied along said ducts for activating said fasteners.

8. An apparatus according to claim 2 wherein said fastener actuator comprises a microcompressor (18), said lines comprising a plurality of ducts (20) connected between said microcompressor and said fasteners, and a piston (21) in each fastener for being actuated by fluid from said microcompressor supplied along said ducts for activating said fasteners.

* * * * *